United States Patent
Iijima

(10) Patent No.: US 10,764,905 B2
(45) Date of Patent: Sep. 1, 2020

(54) TRANSMISSION CONTROL SYSTEM

(71) Applicant: FANUC CORPORATION, Yamanashi (JP)

(72) Inventor: Kazunori Iijima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/914,294

(22) Filed: Mar. 7, 2018

(65) Prior Publication Data
US 2018/0270841 A1 Sep. 20, 2018

(30) Foreign Application Priority Data

Mar. 14, 2017 (JP) .................................. 2017-049085

(51) Int. Cl.
*H04W 72/10* (2009.01)
*H04L 29/08* (2006.01)
(Continued)

(52) U.S. Cl.
CPC ............. *H04W 72/10* (2013.01); *H04L 67/12* (2013.01); *H04L 67/322* (2013.01); *H04W 72/085* (2013.01); *H04W 4/70* (2018.02)

(58) Field of Classification Search
CPC ....... H04L 43/08; H04L 67/12; H04L 67/322; H04W 4/70; H04W 28/0215; H04W 72/085; H04W 72/10; H04W 72/1231; H04W 72/1242; H04W 72/1247; H04W 76/14
See application file for complete search history.

(56) References Cited

U.S. PATENT DOCUMENTS

| | | | | |
|---|---|---|---|---|
| 2013/0301558 A1* | 11/2013 | Zakrzewski | ...... | H04W 28/0215 370/329 |
| 2016/0302215 A1* | 10/2016 | Sorrentino | ............ | H04W 76/14 |

FOREIGN PATENT DOCUMENTS

| | | |
|---|---|---|
| CN | 102629121 | 8/2012 |
| CN | 105959981 | 9/2016 |

(Continued)

OTHER PUBLICATIONS

Notification of Reasons for Refusal dated Sep. 18, 2018 in Japanese Patent Application No. 2017-049085.

(Continued)

*Primary Examiner* — Khao Huynh
(74) *Attorney, Agent, or Firm* — Wenderoth, Lind & Ponack, L.L.P.

(57) ABSTRACT

To provide a transmission control system that can efficiently utilize communication bandwidth upon transmitting measurement data of machines. A transmission control system includes: a numerical control unit that controls operating of machines and acquires operating information; an A/C conversion unit that acquires behavior information measured by way of a sensor provided to the machine; a priority determination unit that determines priority of transmission in accordance with a condition set in advance, based on types and combinations of the operating information and the behavior information; and a bandwidth control unit that controls allocation of communication bandwidth for transmitting the operating information and the behavior information, based on a usage condition of communication bandwidth and the priority.

3 Claims, 2 Drawing Sheets

(51) Int. Cl.
*H04W 72/08* (2009.01)
*H04W 4/70* (2018.01)

(56) References Cited

FOREIGN PATENT DOCUMENTS

| | | | | |
|---|---|---|---|---|
| GB | 2494132 A | * | 3/2013 | ........ H04W 72/1247 |
| JP | 8-70489 | | 3/1996 | |
| JP | 2000-270023 | | 9/2000 | |
| JP | 2003-346262 | | 12/2003 | |
| JP | 2004-200857 | | 7/2004 | |
| JP | 2005-309661 | | 11/2005 | |
| JP | 2007-010198 | | 1/2007 | |
| JP | 2007-249313 | | 9/2007 | |
| JP | 2009-188655 | | 8/2009 | |
| JP | 2009-188884 | | 8/2009 | |
| JP | 2015-67187 | | 4/2015 | |

OTHER PUBLICATIONS

Office Action dated Dec. 27, 2019 in Chinese Patent Application No. 201810201494.8.

* cited by examiner

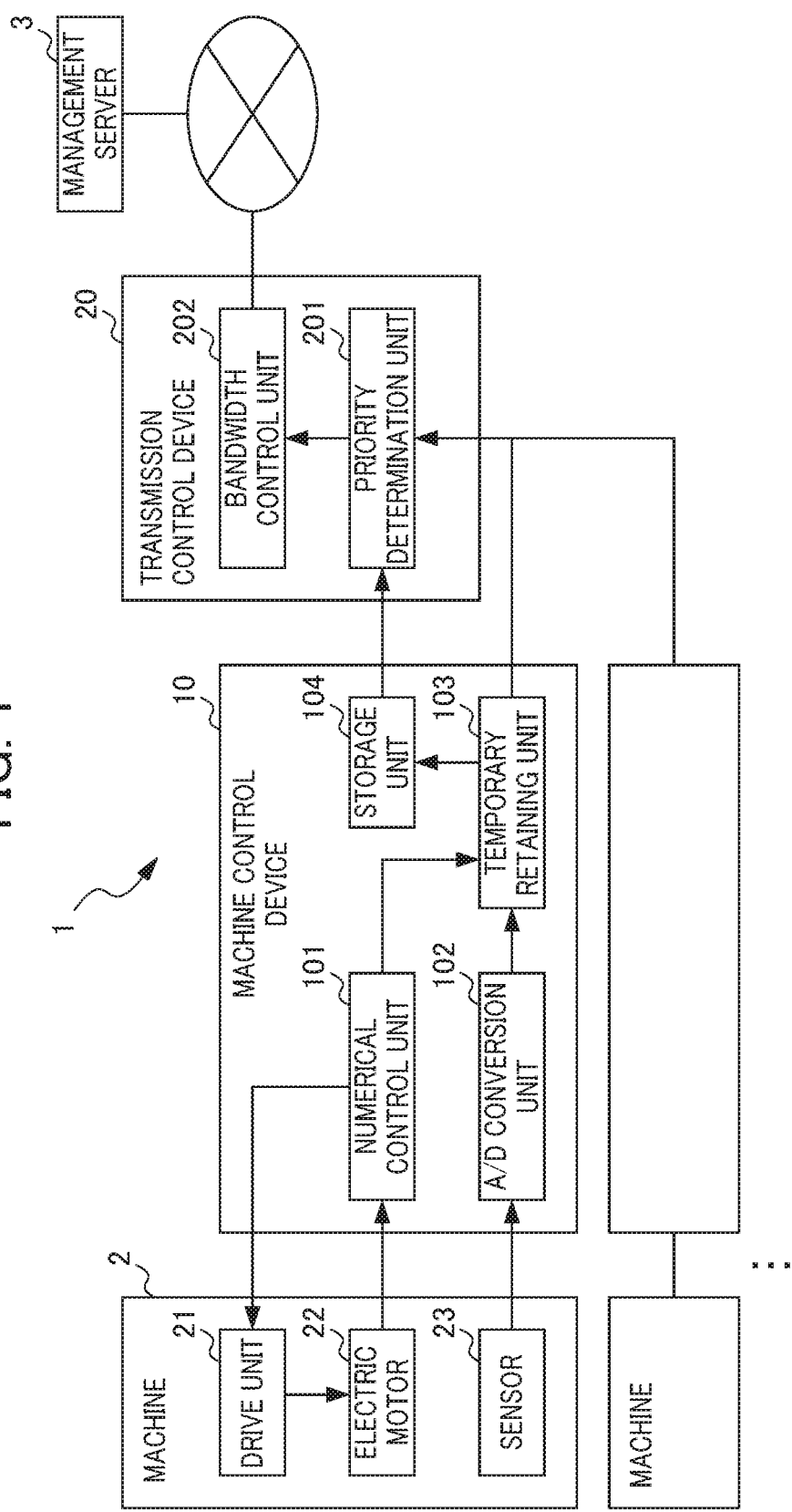

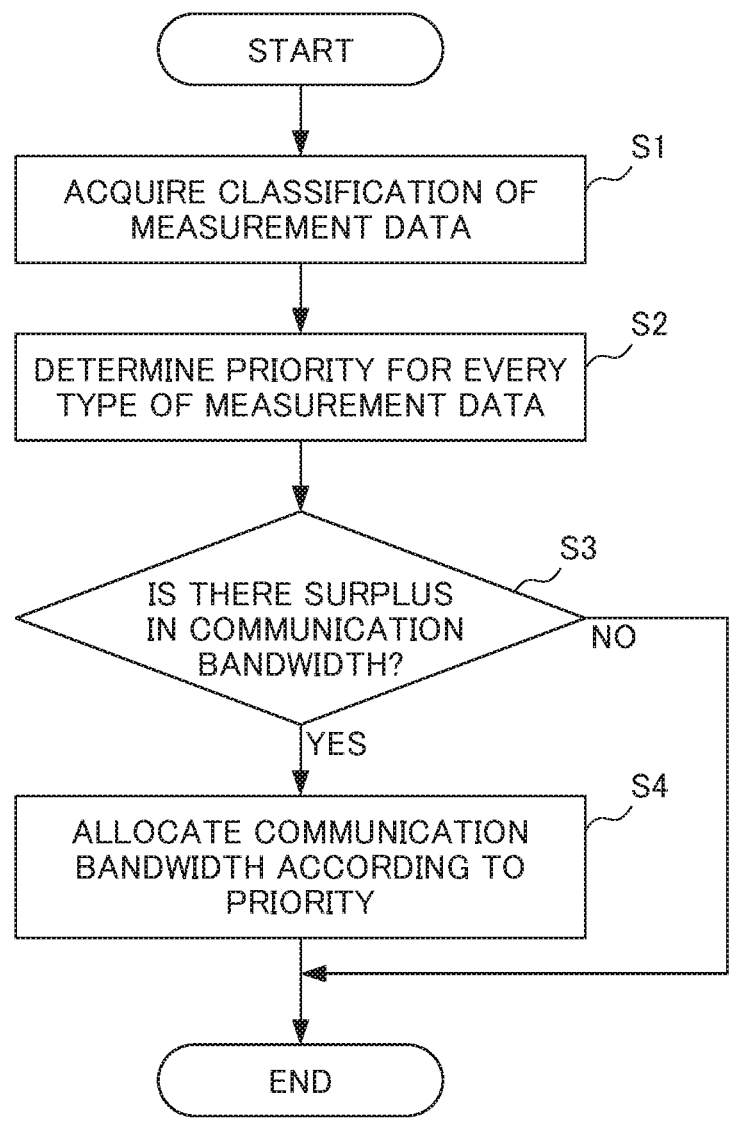

TRANSMISSION CONTROL SYSTEM

This application is based on and claims the benefit of priority from Japanese Patent Application No. 2017-049085, filed on 14 Mar. 2017, the content of which is incorporated herein by reference.

BACKGROUND OF THE INVENTION

Field of the Invention

The present invention relates to a transmission control system for transmitting measurement data of a machine to a host.

Related Art

Conventionally, systems of IoT (Internet of Things) targeting various machines such as machine tools and industrial machines have been constructed. In the case of incorporating machines into a network, and transmitting various data to a management server, since the communication traffic volume increases with an increase in the number of machines connected, the transmittable data volume is limited due to restrictions in the communication bandwidth in the communication network.

Patent Document 1 proposes a system that notifies a host computer only of the state of load equipment for which there has been a change, by referencing the state of load equipment at fixed periods.

Patent Document 1: Japanese Unexamined Patent Application, Publication No. H08-070489

SUMMARY OF THE INVENTION

However, with a system to which a plurality of machines is connected, various types of measurement data are collected from each machine, respectively. Therefore, with a technique that, in the case of there having been a state change, notifies of this state in a batch from every machine as in Patent Document 1, for example, measurement data or combinations having low importance are often included in the transmission data, and there has been a problem in the usage efficiency of the communication network.

The present invention has an object of providing a transmission control system that can efficiently utilize the communication bandwidth upon transmitting the measurement data of machines.

A transmission control system (e.g., the transmission control system 1 described later) according to a first aspect of the present invention includes: a numerical control unit (e.g., the numerical control unit 101 described later) that controls operating of machines (e.g., the machine 2 described later) and acquires operating information; a behavior acquisition unit (e.g., the A/D conversion unit 102 described later) that acquires behavior information measured by way of a sensor (e.g., the sensor 23 described later) provided to the machine; a priority determination unit (e.g., the priority determination unit 201 described later) that determines priority of transmission in accordance with a condition set in advance, based on types and combinations of the operating information and the behavior information; and a bandwidth control unit (e.g., the bandwidth control unit 202 described later) that controls allocation of communication bandwidth for transmitting the operating information and the behavior information, based on a usage condition of communication bandwidth and the priority.

According to a second aspect of the present invention, in the transmission control system as described in the first aspect, the priority determination unit may determine the priority based on a sampling period of the operating information and the behavior information.

According to a third aspect of the present invention, the transmission control system as described in the first or second aspect may further include a storage unit (e.g., the storage unit 104 described later) that stores a history of the operating information and the behavior information, in which the priority determination unit adjusts the priority, according to a variation situation of the operating information and the behavior information in the history.

According to a fourth aspect of the present invention, the transmission control system as described in any one of the first to third aspects may further include a temporary retaining unit (e.g., the temporary retaining unit 103 described later) that temporarily retains the operating information or the behavior information to which communication bandwidth was not allocated to each of the machines.

According to the present invention, it is possible to efficiently utilize communication bandwidth upon transmitting measurement data of machines.

BRIEF DESCRIPTION OF THE DRAWINGS

FIG. 1 is a view showing the configuration of a transmission control system according to an embodiment; and FIG. 2 is a flowchart showing a processing sequence of a transmission control device according to the embodiment.

DETAILED DESCRIPTION OF THE INVENTION

Hereinafter, one example of an embodiment of the present invention will be explained. FIG. 1 is a view showing the configuration of a transmission control system 1 according to the present invention.

The transmission control system 1 is a device group for transmitting various types of measurement data collected from at least one machine 2 having a mechanism driven by an electric motor 22, to a management server 3 connected to a network.

The transmission control system 1 includes a machine control device 10 and transmission control device 20. The machine control device 10 includes a numerical control unit 101, analog/digital (A/D) conversion unit 102 (behavior acquisition unit), temporary retaining unit 103, and storage unit 104. The transmission control device 20 includes a priority determination unit 201, and bandwidth control unit 202.

The numerical control unit 101 controls operation of the machine 2 by outputting a command value for speed, position, etc. to a drive unit 21. The drive unit 21 drives the electric motor 22 by supplying electric power thereto, based on this command value. In addition, the numerical control unit 101 acquires operating information including the command value and feedback from the electric motor 22, and supplies to the temporary retaining unit 103.

The A/D conversion unit 102 acquires behavior information measured by various sensors 23 provided to the machine 2, and supplies to the temporary retaining unit 103. For example, various types of measurement data for every mechanism of the machine 2, such as the temperature, torque and electric current, are included in the behavior information.

The temporary retaining unit 103 retains the operation information provided from the numerical control unit 101 and the behavior information provided from the A/D conversion unit 102, and sends to the communication network in accordance with the control of the transmission control device 20. The temporary retaining unit 103 temporarily retains the operating information or behavior information for which communication bandwidth was not allocated by the transmission control device 20 in each of the machines 2, until transmission is enabled.

The storage unit 104 stores history data of the acquired operating information and behavior information. The history data is provided to the transmission control device 20, and the priority of data to be transmitted is determined.

The priority determination unit 201 determines the priority for transmission in accordance with conditions set in advance, based on the types and combinations of operating information and behavior information, and notifies to the bandwidth control unit 202. As the conditions, for example, the measurement data of a mechanism to be preferentially monitored may be set in advance based on the type of machine, operating pattern, etc.

Furthermore, the priority determination unit 201 determines the priority based on the sampling period of operating information and behavior information. For example, real-time data such as electric current and position is always prioritized more than data for which changes are slow such as the operating time and temperature of the machine 2.

In addition, the priority determination unit 201 dynamically adjusts the priority according to the variation situation of operating information and behavior information in the history data acquired from the machine control device 10. For example, as mentioned above, in the case of the variation (amount or period) in temperature, which usually has low priority, being great, the priority determination unit 201 judges the temperature as not being normal, and sets the priority for transmission as high.

The bandwidth control unit 202 controls the allocation of communication bandwidth for transmitting the operating information and behavior information, based on the usage condition of the communication bandwidth and priority. The bandwidth control unit 202 may change the packet speed of measurement data to transfer to the communication network, or processing frequency. The bandwidth control unit 202 determines the transfer sequence of measurement data, while monitoring the availability of communication bandwidth, and transmits to the management server 3, in order from the measurement data having higher priority.

FIG. 2 is a flowchart showing the processing sequence of the transmission control device 20 according to the present embodiment. The present processing is repeatedly executed consecutively while the collection of measurement data is being performed.

In Step S1, the priority determination unit 201 acquires classification of the measurement data being retained from the temporary retaining unit 103. The priority determination unit 201 further acquires history data from the storage unit 104.

In Step S2, the priority determination unit 201 collates the classification of measurement data acquired in Step S1, operating pattern of the machine 2 based on the history data, mechanism configuration sent separately or stored, and the like, with the conditions set in advance, and then determines the priority of every set of measurement data.

In Step S3, the bandwidth control unit 202 monitors the usage condition of the communication network, and decides whether there is surplus in the communication bandwidth. In the case of this decision being YES, the processing advances to Step S4, and in the case of the decision being NO, the processing ends.

In Step S4, since there is surplus in the communication bandwidth, the bandwidth control unit 202 allocates communication bandwidth in order from the measurement data having the highest priority determined in Step S2, and transmits to the management server 3 from the temporary retaining unit 103.

According to the present embodiment, the transmission control system 1 determines the priority of transmission of the respective sets of measurement data in accordance with the condition set in advance, based on the types and combination of operating information and behavior information collected from the plurality of machines 2, and then controls the allocation of bandwidth. Therefore, the transmission control system 1, since it is possible to appropriately determine the measurement data prioritized in the respective machines 2, according to the mechanism and operating pattern of the machine 2, can efficiently utilize the communication bandwidth upon transmitting the measurement data of machines, and can stably transmit the measurement data to be monitored.

Since the transmission control system 1 determines the priority based on the sampling period of the respective measurement data, the measurement data to be sampled at high speed due to greatly varying in a short time such as electrical current or position is preferentially transmitted. Therefore, the transmission control system 1 can stably transmit measurement data to be monitored in a timely manner.

Furthermore, the transmission control system 1 stores the history data of operating information and behavior information, and adjusts the priority according to the variation situation of this history data; therefore, it is possible to preferentially transmit measurement data that differs from usual, and it is possible to appropriately transmit added value information which is useful in preventive maintenance.

In addition, the transmission control system 1, due to including the temporary retaining units 103 corresponding to each of the machines 2, can prevent the loss of measurement data for which transmission was deferred due to non-surplus in communication bandwidth.

Although an embodiment of the present invention has been explained above, the present invention is not to be limited to the aforementioned embodiment. In addition, the effects described in the present embodiment are merely listing the most preferred effects produced from the present invention, and the effects according to the present invention are not to be limited to those described in the present embodiment.

The configurations of the devices included by the transmission control system 1 in the present embodiment are examples, and the respective functional units may be integrated or decentralized as appropriate. For example, the transmission control device 20 may include the temporary retaining unit 103 and storage unit 104. Simplification of the communication control between the plurality of machine control devices 10 and transmission control device 20 can be expected thereby. In addition, the information processing device in which a plurality of machine control devices 10 and transmission control devices 20 are integrated may be provided.

The numerical control device 101 of the present embodiment is not limited to CNC (Computerized Numerical Control), and may be a PLC (programmable Logic Controller) or the like.

The transmission control method according to the transmission control system 1 is realized by software. In the case of being of realized by software, the programs constituting this software is installed to a computer. In addition, these programs may be recorded on removable media and distributed to the user, or may be distributed by being downloaded to the user's computer via networks.

EXPLANATION OF REFERENCE NUMERALS

1 transmission control system
2 machine
3 management server
10 machine control device
20 transmission control device
21 drive unit
22 electric motor
23 sensor
101 numerical control unit
102 A/D conversion unit (behavior acquisition unit)
103 temporary retaining unit
104 storage unit
201 priority determination unit
202 bandwidth control unit

What is claimed is:

1. A transmission control system comprising:
    a machine control device that (i) controls operation of a machine and acquiring operating information, and (ii) acquires behavior information measured using a sensor provided to the machine; and
    a transmission control device that (i) determines a priority of transmission in accordance with a condition set in advance, based on types and combinations of the operating information and the behavior information, and (ii) controls allocation of communication bandwidth for transmitting the operating information and the behavior information, based on a usage condition of communication bandwidth and the priority,
    wherein the transmission control device determines the priority based on a sampling period of the operating information and the behavior information such that a priority for real-time data is higher than a priority for data for which changes are slow.

2. The transmission control system according to claim 1, wherein the machine control device stores a history of the operating information and the behavior information,
    wherein the transmission control device adjusts the priority, according to a variation situation of the operating information and the behavior information in the history.

3. The transmission control system according to claim 1, wherein the machine control device temporarily retains the operating information or the behavior information to which communication bandwidth was not allocated.

* * * * *